United States Patent [19]

Kayser

[11] 4,001,890
[45] Jan. 4, 1977

[54] DOUBLE CHIP FLYING HEAD

[75] Inventor: Wolfgang W. O. G. Kayser, Paradise Valley, Ariz.

[73] Assignee: Honeywell Information Systems Inc., Waltham, Mass.

[22] Filed: Aug. 5, 1974

[21] Appl. No.: 495,028

[52] U.S. Cl. .............................. 360/121; 360/113; 360/123; 360/127

[51] Int. Cl.² .................. G11B 5/28; G11B 5/12; G11B 5/30; G11B 5/20

[58] Field of Search ............ 360/121, 113, 112, 31, 360/123, 127

[56] References Cited

UNITED STATES PATENTS

| | | | |
|---|---|---|---|
| 3,529,349 | 9/1970 | Schoot et al. | 360/127 |
| 3,813,766 | 6/1974 | Brock et al. | 360/123 |
| 3,887,944 | 6/1975 | Bajorek et al. | 360/113 |
| 3,889,295 | 6/1975 | Billawala | 360/123 |

FOREIGN PATENTS OR APPLICATIONS 876,824 9/1961 United Kingdom ............ 360/112

OTHER PUBLICATIONS

Brock, "Magnetoresistive Read/Write Head," IBM Tech. Disc. Bull., vol. 15, No. 4, Sept. 1972, p. 1206.
Davy, "Batch Fabricated Tunnel Erase Head," IBM Tech. Disc. Bull., vol. 15, No. 6, Nov. 1972, p. 2036.

*Primary Examiner*—Robert S. Tupper
*Attorney, Agent, or Firm*—John S. Solakian; Nicholas Prasinos; Ronald T. Reiling

[57] ABSTRACT

A plurality of thin-film transducer chips are mounted on a flying head. The head is mounted adjacent a magnetic storage medium having a plurality of closely spaced tracks. Each of the transducer chips has a transducer adjacent a corresponding one of each of the tracks of the storage medium so that a plurality of transducers may be used for reading or writing on each of the tracks. A specially designed write transducer may be used to write on each track and another specially designed read transducer may be used to read from each track.

4 Claims, 7 Drawing Figures

DOUBLE CHIP FLYING HEAD

BACKGROUND OF THE INVENTION

This invention relates to thin-film magnetic transducers and more particularly to a plurality of thin-film transducer chips which are mounted on a magnetic flying head. The head is mounted adjacent a magnetic storage medium having a plurality of closely spaced tracks. Each of the transducer chips has a transducer adjacent a corresponding one of each of the tracks of the storage medium so that a plurality of transducers may be used for reading or writing on each of the tracks of the magnetic storage medium.

In high speed data processing systems data is stored on magnetic tape or magnetic disks for retrieval and use at a later time. It is important that large quantities of data be stored as compactly as possible to minimize the number of reels of tape or the number of disks used with the data processing system. It is also important that data be located on the magnetic medium and retrieved as quickly as possible while the data is being processed. In order to do this, magnetic disks may use a large plurality of tracks of data with a transducer positioned over each of the tracks. Such transducers must be very small when a large number of tracks are used and yet these transducers should produce a comparatively large signal so that noise in the system will not interfere with the data being retrieved. In some prior art systems a flying head carrying a read/write transducer head is positioned over the tracks. The output signal from these prior art transducers is relatively low and the lower frequency response is limited. In these prior art systems the flying heads must be repositioned each time it is desired to read or write information on any of the tracks of the magnetic recording medium.

Other prior art systems use a plurality of flying heads each having a plurality of ferrite read/write transducers. Each of these read/write transducers may be aligned with the other transducers so that the tracks served by one flying head interleave with tracks served by the other flying heads. For example, when three flying heads are used, the first head has transducers over tracks 1, 4, 7 etc., the second head has transducers over tracks 2, 5, 8 etc. and the third head has transducers over tracks 3, 6, 9 etc. If each head has 20 transducers the heads must be repositioned when more than 60 tracks are used on the storage medium.

In the prior art systems using read/write transducers and a disk as a storage unit the disk must complete one revolution after information is written on the medium before this information can be read and checked. This requires a relatively long period of time.

The present invention alleviates some of the disadvantages of the prior art by using thin-film inductive transducers to write information on the tracks of the magnetic storage medium and uses thin-film magnetoresistive transducers to read information from each of the tracks on the magnetic storage medium. In the present invention both the thin-film magnetic transducer and the thin-film magnetoresistive transducers are mounted on the same magnetic flying head so that information can be recorded on a portion of the medium as the disk moves under the inductive write transducer and can be read and checked as this same portion of the medium moves under the magnetoresistive read transducer. The read transducer may be mounted adjacent the write transducer so that the time between "writing" and "reading" is relatively short.

These thin-film transducers may be relatively small so that several hundred transducers may be formed across each inch of the flying head. Rows of these transducers may be positioned adjacent the disk so that information can be written on all of the tracks which are under the flying head transducers without moving the flying head. This increases the speed of data storage and retrieval.

The inductive write transducer and the magnetoresistive read transducer for each track can both be formed on a single substrate to facilitate aligning the write transducers with the read transducers for each of the tracks of the magnetic medium.

It is, therefore, an object of this invention to provide a magnetic flying head having a plurality of thin-film transducers for each track of a magnetic recording medium.

Another object of this invention is to provide at least one separate read transducer and one separate write transducer for the same magnetic track with both transducers being mounted on the same flying head.

A further object of this invention is to provide a flying head covering a plurality of tracks with each track having a plurality of thin-film transducers.

Still another object of this invention is to provide a flying head having a thin-film read transducer and a thin-film write transducer fabricated on the same substrate.

SUMMARY OF THE INVENTION

The foregoing objects are achieved in the present invention by employing a plurality of thin-film transducer chips each of which are mounted on a single flying head. The head is mounted adjacent a magnetic storage medium having a plurality of closely spaced tracks. Each of the transducer chips has a transducer adjacent a corresponding one of each of the tracks of the storage medium so that a plurality of transducers may be used for reading or writting on each of the tracks. A specially designed write transducer may be used to write on each track and another specially designed read transducer may be used to read from each track.

Other objects and advantages of this invention will become apparent from the following description when taken in connection with the accompanying drawings.

DESCRIPTION OF THE PREFERRED EMBODIMENT

Figure 1:
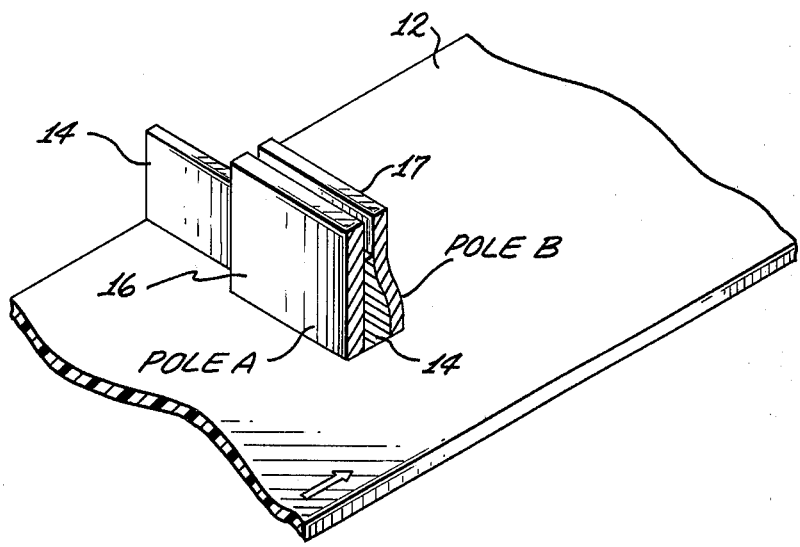
FIGS. 1 and 2 illustrate transducers which may be used to record and read data from a magnetic medium.

FIGS. 1–6 illustrate transducers which may be used to record information on the magnetic medium and to retrieve the recorded information from the magnetic medium. For example, FIG. 1 illustrates a magnetic transducer having a pole A and a pole B mounted adjacent a moving magnetic medium 12. Current in the conductor 14 produces a magnetic flux which flows through the magnetic material of the poles A and B across the flux gap between poles A and B. A portion of the flux between poles A and B goes through the magnetic medium 12 thereby polarizing the particles in a magnetic medium and recording data in the form of a pattern of magnetic polarization in the magnetic medium 12. The magnetic head shown in FIG. 1 may be constructed by depositing a first magnetic film 16 on an insulator or a substrate (not shown), then depositing the conductor 14 on the magnetic film 16 and later depositing a second magnetic film 17 on the conductor and on one edge of the first magnetic film 16. Insulating material may be deposited between conductor 14 and the magnetic films or the insulating material may be omitted as shown. Current flowing through the conductor produces a magnetic flux between poles A and B.

Figure 2:
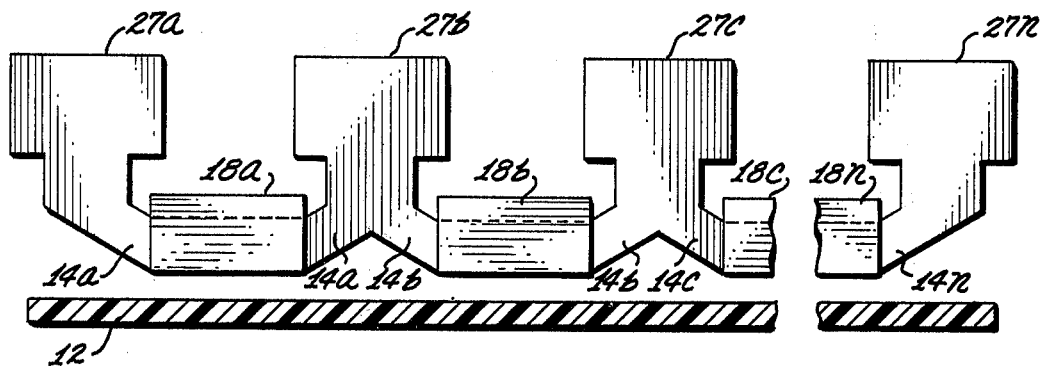

FIG. 2 shows a side view of the discrete thin-film magnetic transducers with transducers 18a–18n positioned adjacent the magnetic medium 12. As the magnetic medium 12 moves away from the viewer the magnetic flux in transducer 18a records information in a track or path on the magnetic medium which passes immediately adjacent transducer 18a. At the same time this information is also recorded in the tracks which are adjacent the transducers 18b–18n. Current applied to the connector terminals 27a–27n provides the magnetizing force which causes the information to be recorded in the tracks adjacent the transducers 18a–18n. Connection to the conductors 14a–14n is made on the pads or connector terminals 27a–27n. Each of the pads between the transducers is connected to the connductor for two of the transducers. For example, pad 27b is connected to conductor 14a of transducer 18a and to conductor 14b of transducer 18b.

Figure 3:
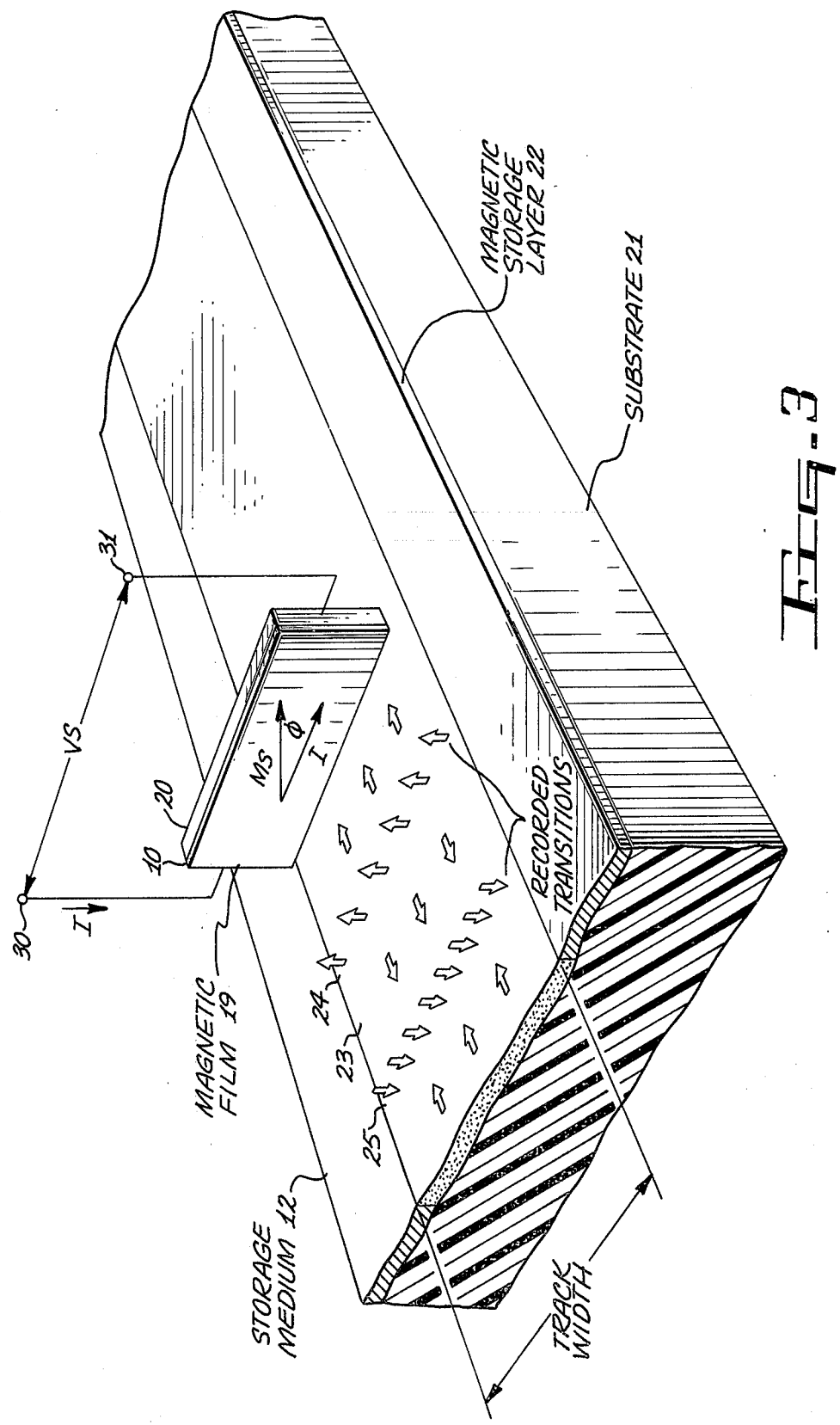
FIGS. 3 and 4 illustrate the operation of a magnetoresistive transducer mounted adjacent a storage medium.

FIG. 3 shows a magnetoresistive transducer 10 having a thin-film 19 which is deposited on a nonconductive substrate 20. The magnetoresistive transducer 10 is mounted in a vertical position at right angles to the surface of a storage medium 12 which may be magnetic tape, magnetic disk or magnetic ink characters on checks and credit cards. A large plurality of transducers may be mounted side by side and information recorded in a plurality of tracks, each of which pass under a corresponding one of the transducers. These transducers may be relatively small so that there are approximately one hundred to several hundred tracks per inch across the storage medium. A recording head records the data or information in each of the tracks in the form of small magnetized areas of the medium. These magnetized areas may be represented by the vectors which show the direction of a resulting magnetic field. For example, the track shown in FIG. 3 illustrate binary bits as small areas with arrows showing the direction of the magnetic field. In area 23 the magnetic field enters the area above the tape at the transition 24 from the magnetic layer, moves from right to left to transition point 25 and moves downward from the transition point. These vertical vectors at transition points 24 and 25 cause the orientation of the magnetic film 19 to move toward alignment with the vectors in the storage medium as the storage medium moves under the transducer 10. When the transition 24 moves under the transducer 10, the magnetization of the magnetic film 19 is rotated in an upper direction and when transition 25 moves under the transducer 10 the magnetization of the magnetic film is oriented in a downward direction. The angle of rotation of the magnetization of the magnetic film is determined by the strength of the magnetic field emanating from the medium. When the vertical field in the medium is strong the magnetization of the magnetic film 19 may be in a vertical direction. When the vertical field in the medium is relatively weak the magnetization of the magnetic film 19 may move upward by only a small angle from the surface of the storage medium. When a transducer 10 is over the area between the transitions 24 and 25, the magnetization of film 19 is substantially oriented in a horizontal direction.

Certain magnetic material may be deposited in a thin-film on a sheet of non-magnetic material. When these magnetic materials are deposited in the presence of a magnetic field, the thin magnetic film exhibits a property of uniaxial anisotropy. Uniaxial anisotropy is understood to mean the tendency of the magnetic moments throughout the film to align themselves along a preferred axis of magnetization. This preferred axis is often referred to as the "easy axis", while a direction of magnetization perpendicular to this axis in the plane of the film is referred to as the transverse or "hard axis" of the film. The uniaxial thin magnetic film exhibits an easy axis of magnetization defining opposite stable states of remanent flux orientation. Isotropic materials may be used and shape anisotropy may be utilized to achieve essentially anisotropic behavior of the transducer film.

The value of the resistance between terminals 30 and 31 is determined by the isotropic or fixed resistance of the film 19 and by the orientation of the magnetization of the thin-film magnetic film 19 of transducer 10. The value of the magneto resistance is proportional to the square of the cosine of the angle between the current density vector I, of FIGS. 3 and 4, and the magnetization vector MS in the thin-film. The direction of the magnetization vector in the thin-film is the same as the direction of the magnetization vector 35 (FIG. 4) leaving the surface of the oxide layer 22 of the magnetic storage medium 12 when the magnetizing force is equal to or larger than the anisotropy field. When the magnetizing force is less than the value of the anisotropy field the direction of the magnetization vector is between the position of the easy axis 39 and the +HA vector of FIG. 4. When a constant value of current I flows between terminals 30 and 31 (FIG. 3) the voltage between these terminals is determined by the isotropic resistance and by the direction of the magnetization in the thin-film 19. Thus, the voltage across terminals 30 and 31 is determined by isotropic resistance and the direction of magnetization of storage medium 12 which is used to store data.

Figure 4:
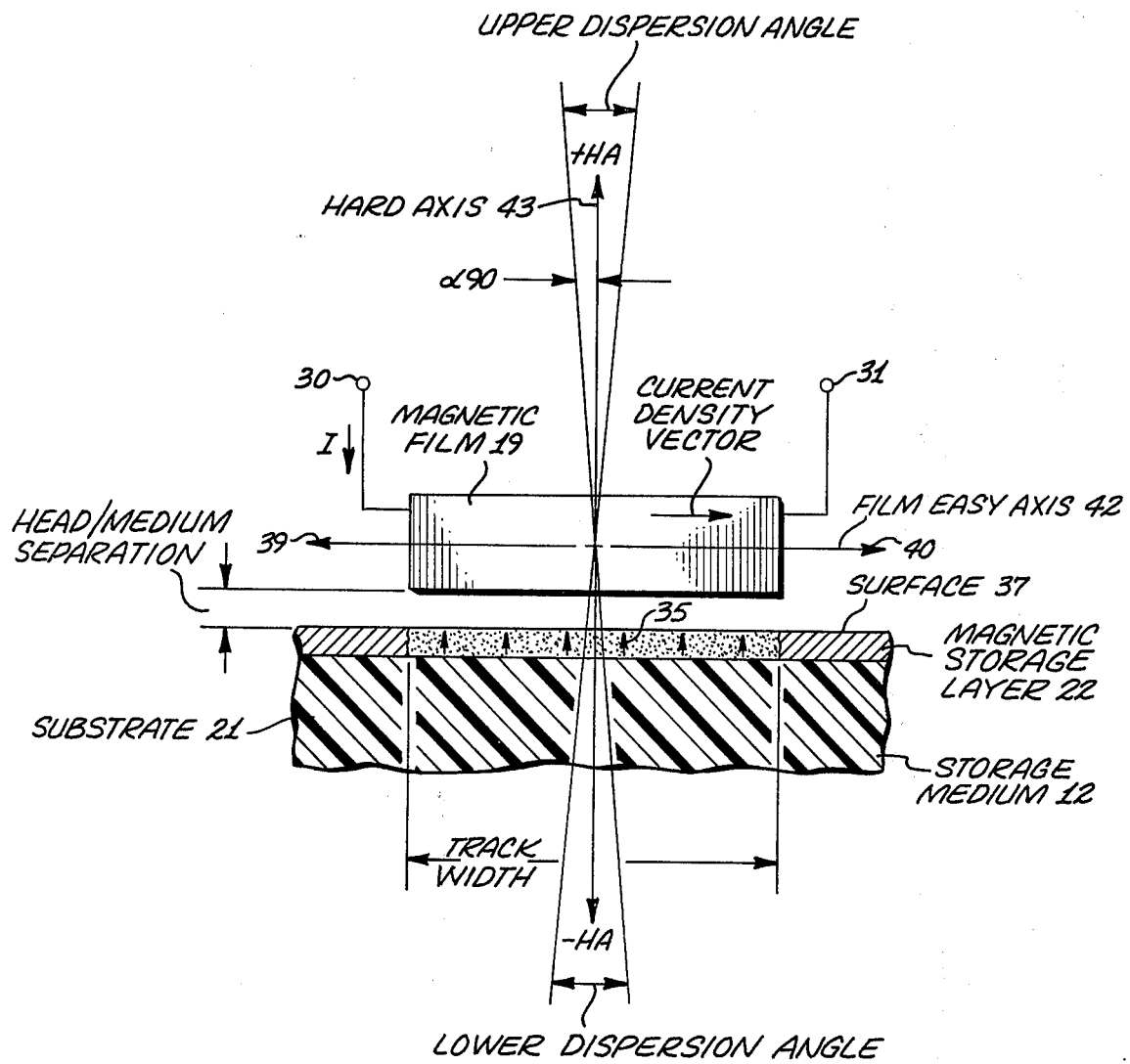

The operation of the magnetoresistive transducer will now be described in connection with FIG. 4. The thin magnetic film 19 of transducer 10 is saturated by aligning the magnetization in a horizontal direction with the easy axis 42 of the film being parallel to the surface 37 of the storage medium 12. This means that the magnetization of the film 19 will be oriented in the direction of vector 39 or in the direction of vector 40 during the time when there is an absence of vertical vectors in oxide layer 22 of the storage media. When the vertical vectors 35 in the oxide layer 22 are moved under the magnetic film 19 the magnetization of the film is rotated toward the position of the hard axis −HA. When the applied magnetic force HA is equalled to or greater than the force required to saturate, called HK, the film is oriented with 90 percent of the magnetization within the dispersion angle, α 90. The applied magnetizing force is equal to or greater than HK when the relatively large values of signal are used to magnetize the film 19. When the vectors 35 move away from film 19 any magnetization which is oriented in the direction of +HA within the upper dispersion angle may return to either the direction shown by vector 39 or to the direction shown by vector 40. When vectors 35 are reversed to point in a downward direction the magnetization is oriented into a position of the hard axis −HA. When a downward vector 35 moves away from the film 19 the magnetization which is oriented parallel to −HA but within the lower dispersion angle may return to either the direction of vector 39 or the direction of vector 40.

A complete description of a magnetoresistive transducer is disclosed in a copending patent application by Wolfgang Kayser entitled "Thin Film Magnetoresistive Transducers With Rotated Magnetic Easy Axis" bearing Ser. No. 428,581 filed on Dec. 26, 1973, and now U.S. Pat. No. 3,921,218.

Figure 5:
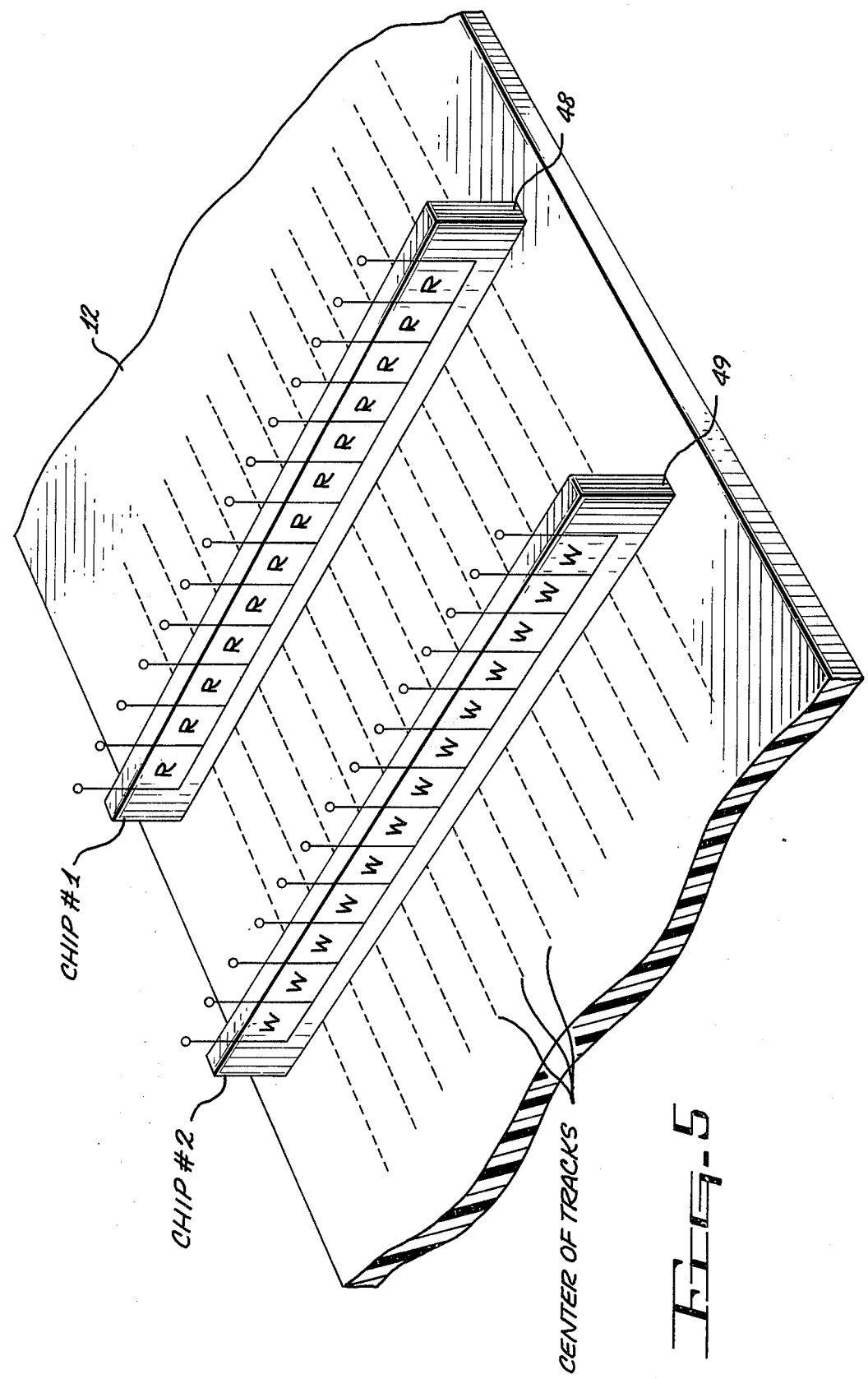
FIG. 5 illustrates one embodiment of the present invention showing both read transducer and write transducer chips mounted adjacent a magnetic storage medium.

FIG. 5 illustrates an embodiment of the present invention wherein the read transducers are mounted on the first chip 48 and the write transducers are mounted on an adjacent chip 49. Data may be written on the moving magnetic medium 12 on the tracks adjacent the transducers on the chip 48 and the same information may be read almost immediately by the transducers mounted on the chip 48 to verify that the data was recorded properly. Prior art apparatus required almost a complete revolution of a magnetic disk before the data could be read by the read transducers. If desired the chip 48 and chip 49 may be cemented together so that the distance between the chips is very small. It is also possible to mount or deposit a magnetic shield between the inductive and the magnetoresistive transducers to provide isolation between the read transducers and the write transducers as shown in FIG. 7. In FIG. 7 the write transducers 52 of the type shown in FIGS. 5 and 6 may be mounted on chip 48 and the read transducers 51 mounted on the chip 48. The read transducers may also be deposited on one side of a chip and the write transducers on the other side of the same chip.

Figure 6:
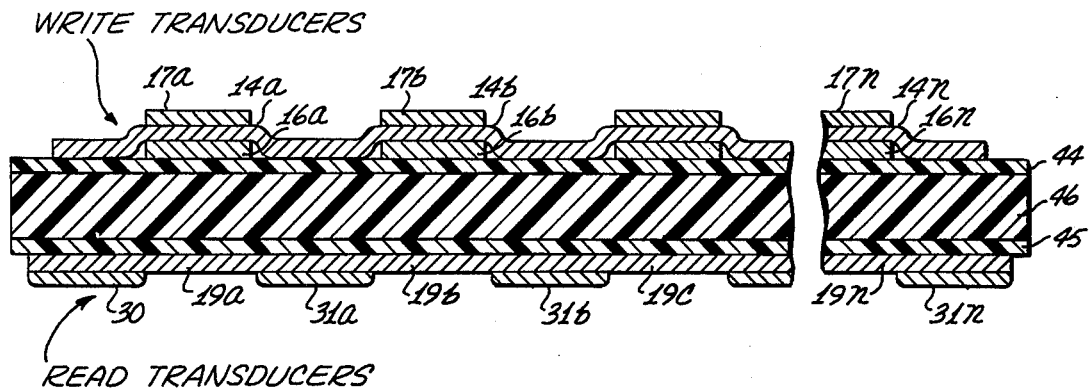
FIG. 6 illustrates read transducers and write transducers mounted on a single substrate.
Figure 7:
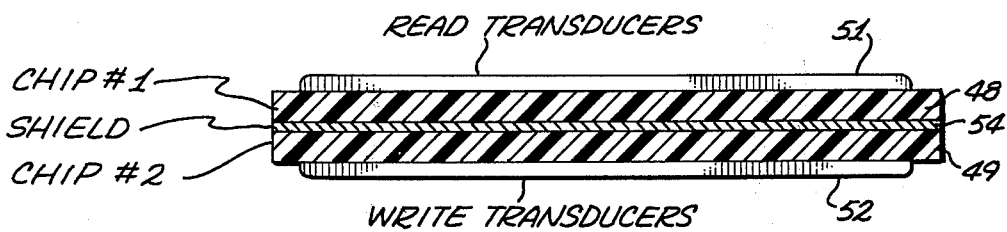
FIG. 7 illustrates another embodiment of the present invention with the read transducers and the write transducers being separated by an electromagnetic shield.

FIG. 6 illustrates another embodiment of the present invention wherein the inductive "write" transducers are mouned on one side of a substrate 46 and the magnetoresistive "read" transducers are mounted on the opposite side of the same substrate. In the apparatus shown in FIG. 6 a plurality of thin-film magnetic poles 16a–16n are deposited on an insulating surface 44 of substrate 46. A conductor may then be deposited on the poles 16 either in a continuous strip as shown in FIG. 6 or a plurality of short conductors 14a–14n may be deposited on the poles 16 and on the insulating surface 44. A plurality of poles 17a–17n are then deposited on the conductor. The magnetoresistive or read transducers are then deposited on the opposite side of the substrate 46. First the resistive magnetic film 19 is deposited on the insulating surface 45 of the substrate 46 followed by terminals 30 and 31 which are deposited on the layer 19.

While the principles of the invention have now been made clear in an illustrative embodiment, there will be many obvious modifications of the structure, proportions, materials and components without departing from those principles. The appended claims are intended to cover any such modifications.

I claim:

1. A multitrack magnetic read/write head for use with a movable magnetic recording medium having a plurality of tracks, said head having a plurality of transducers for each of said tracks, said head comprising:

a substrate having first and second mutually spaced surfaces normal to the plane of said medium, the distance between said first and said second surfaces being relatively small compared to the length dimension of each of said surfaces in a direction parallel to the plane of said medium;

a plurality of first magnetic write poles mounted in spaced relationship in a row on said first surface;

a plurality of second magnetic write poles each overlying a corresponding first write pole in paired alignment therewith;

a continuous write conductor, successive spaced portions of said write conductor being mounted between said write pole pairs to form successive spaced write transducers;

a plurality of write terminals mounted on said continuous conductor between said spaced write transducers;

a magnetoresistive film deposited on said second surface of said substrate and extending along the full length dimension thereof opposite said write transducers; and a plurality of read terminals respectively mounted on said magnetoresistive film opposite corresponding spaces between said write transducers to form read transducers.

2. The apparatus of claim 1 wherein said substrate consists of a pair of superposed wafers, and a magnetic shield disposed between said wafers.

3. The apparatus of claim 1 and further including first and second insulating surfaces, said first insulating surface being interposed between said first substrate surface and said first write poles, said second insulating surface being interposed between said second substrate surface and said magnetoresistive film.

4. The apparatus of claim 3 wherein said continuous write conductor is further disposed in contact with said first insulating surface in the spaces between successive write transducers.

* * * * *

UNITED STATES PATENT OFFICE
CERTIFICATE OF CORRECTION

PATENT NO. : 4,001,890
DATED : January 4, 1977
INVENTOR(S) : Wolfgang W.O.G. Kayser It is certified that error appears in the above-identified patent and that said Letters Patent are hereby corrected as shown below:

Please change the title from "DOUBLE CHIP FLYING HEAD" to --THIN FILM READ/WRITE TRANSDUCER CHIPS--.

Signed and Sealed this

Twelfth Day of April 1977

[SEAL]

Attest:

RUTH C. MASON
Attesting Officer

C. MARSHALL DANN
Commissioner of Patents and Trademarks